United States Patent [19]

Watanabe et al.

[11] Patent Number: 4,661,890

[45] Date of Patent: Apr. 28, 1987

[54] LAMP UNIT

[75] Inventors: Yoshimi Watanabe; Norihiro Umeoka; Hiroshi Kuroda, all of Yokohama, Japan

[73] Assignee: Kabushiki Kaisha Toshiba, Kawasaki, Japan

[21] Appl. No.: 845,869

[22] Filed: Mar. 28, 1986

[30] Foreign Application Priority Data

Mar. 29, 1985 [JP] Japan .................................. 60-65918

[51] Int. Cl.⁴ .......................... F21S 3/00; G03B 27/54; H01J 1/62
[52] U.S. Cl. ..................................... 362/217; 362/219; 362/220; 362/224; 355/70; 355/37; 313/488
[58] Field of Search ............... 362/217, 219, 220, 223, 362/224, 236, 260; 355/70, 37; 313/488

[56] References Cited

U.S. PATENT DOCUMENTS

| | | | |
|---|---|---|---|
| 3,541,752 | 10/1974 | Terajiwa et al. | 355/70 |
| 3,809,944 | 5/1974 | Jongerius et al. | 313/488 |
| 3,987,331 | 10/1976 | Schraurs | 313/488 |
| 4,086,010 | 4/1978 | Gallo, Jr. et al. | 355/70 |
| 4,194,827 | 3/1980 | Blocker et al. | 355/70 |
| 4,367,518 | 1/1983 | Roberts | 362/224 |
| 4,519,703 | 5/1985 | Lehman et al. | 355/37 |

Primary Examiner—Raymond A. Nelli
Attorney, Agent, or Firm—Cushman, Darby & Cushman

[57] ABSTRACT

A lamp unit includes a pair of support members facing each other and three baseless fluorescent lamps supported parallel to one another by the support members. Each support member has three support recesses located at predetermined intervals. One end of each lamp is fixedly inserted into each corresponding support recess of one of the support member and the other end to each corresponding support recess of the other support member. Each lamp has a radiation window extending in the axial direction thereof. The lamps are positioned so that light beams emitted from the windows thereof intersect on a desired straight line.

13 Claims, 4 Drawing Figures

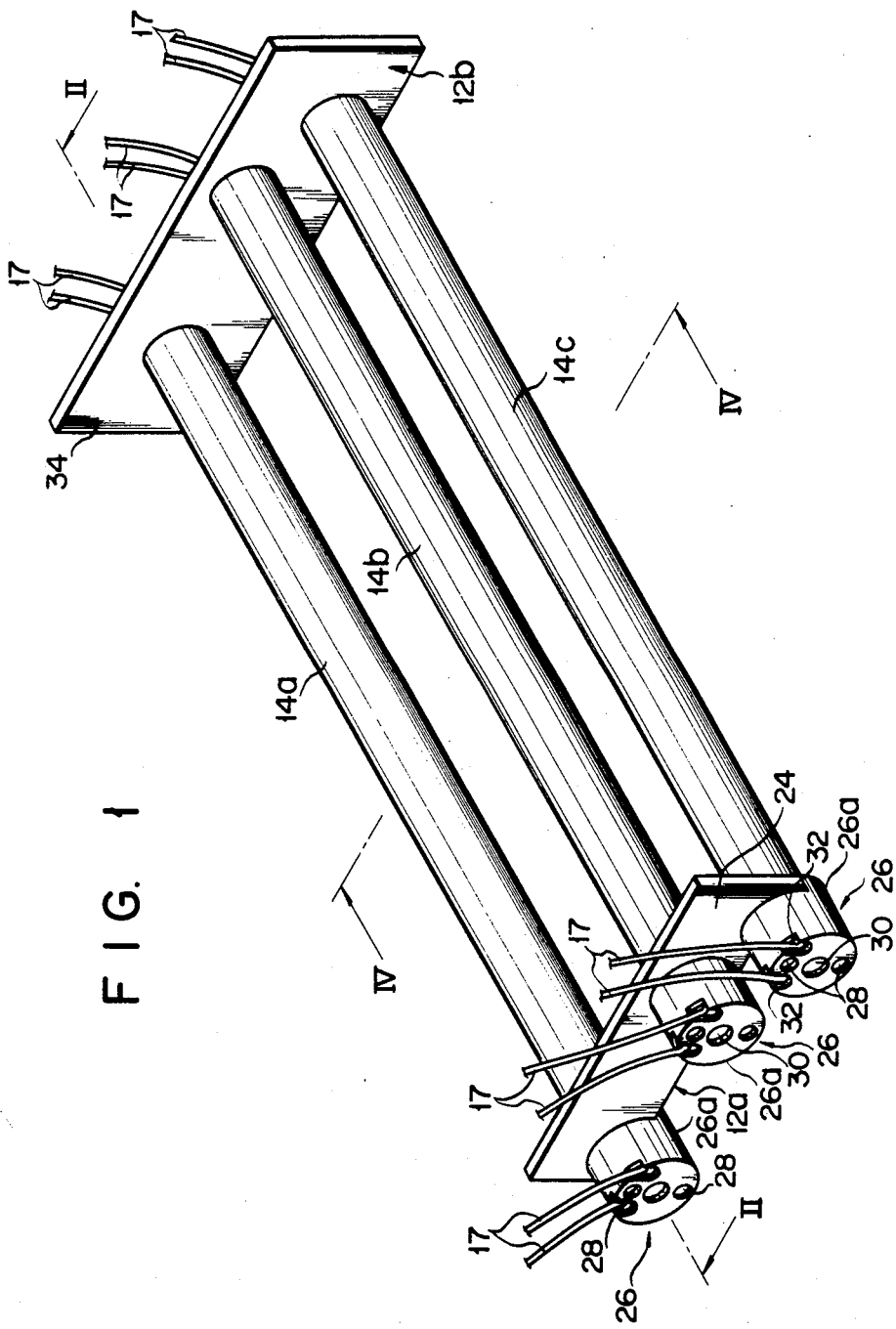

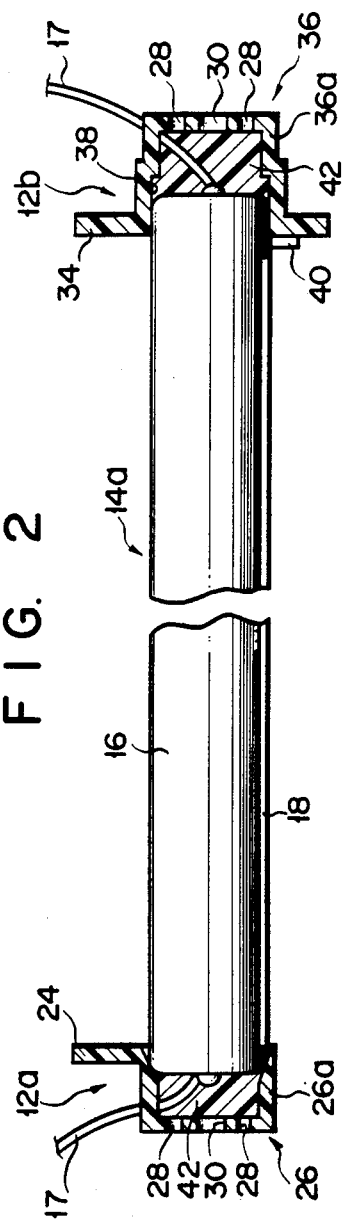
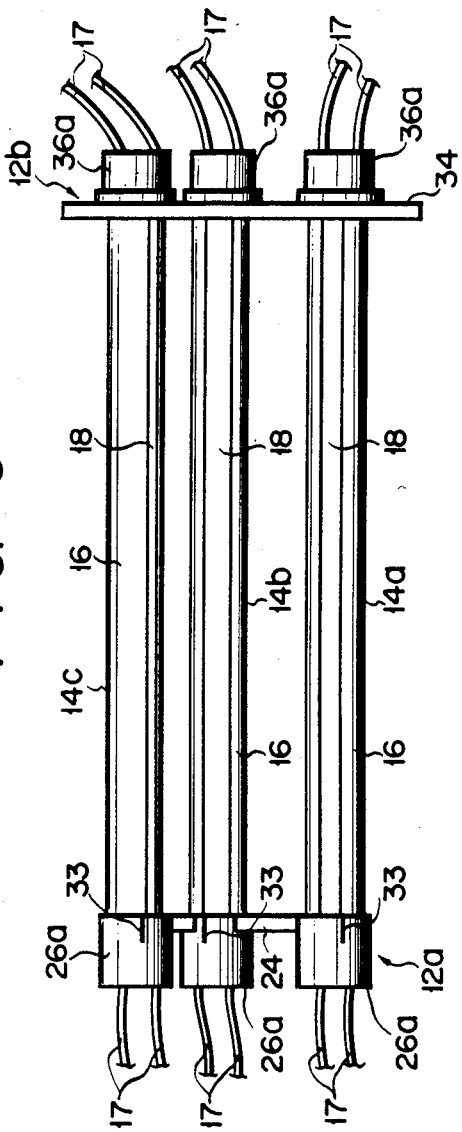

LAMP UNIT

BACKGROUND OF THE INVENTION

The present invention relates to a lamp unit used as a light source for copying machines, facsimiles or other equipment.

Conventional light sources for copying machines include, for example, a combination of straight fluorescent lamps. Generally, fluorescent lamps comprise a bulb, a pair of bases fixed to either end of the bulb, and a pair of base pins protruding from each base. The lamps are placed in the housing of the copying machine so that their base pins fit into sockets in the housing. In a copying machine, an aparature-type or reflection-type fluorescent lamp are utilized, which are provided with an elongate radiation window which extends throughout the axial length of the lamp and through which visible light beams are emitted.

Since the interior of the copying machine is very narrow, however, the lamps cannot easily be replaced. The fluorescent lamps are arranged so that light beams radiated from the respective radiation windows of the lamps are converged on a single line. When locating the lamps by fitting their base pins into the sockets in the machine housing, it is difficult to mount the lamps accurately in position, and a fine adjustment of the mounting position of each individual lamp is impossible, owing to play between the pins and sockets. Accordingly, the light beams emitted from the fluorescent lamps cannot easily be converged on a desired straight line, lowering the operating efficiency of the copying machine. Furthermore, the lamps must be individually replaced and positioned, which is time-consuming in terms of maintenance.

SUMMARY OF THE INVENTION

The present invention is contrived in consideration of these circumstances, and intended to provide a lamp unit which can easily be attached to and detached from copying machines or other apparatuses, and can maintain fixed positional relationships between fluorescent lamps.

In order to achieve the above object, a lamp unit according to the present invention comprises first and second support members facing each other, the support members each including a plurality of support portions arranged at predetermined intervals, the support portions of the first support member being disposed directly opposite those of the second support member; and a plurality of baseless fluorescent lamps supported parallel to one another by the first and second support members, the lamps each including a straight bulb with two sealed ends and lead wires extending from the ends of the bulb, the bulb having an elongate radiation window extending in the axial direction thereof, one end of the bulb being fixed to each corresponding support portion of the first support member and the other end to each corresponding support portion of the second support member, with the radiation window thereof oriented in a predetermined direction.

BRIEF DESCRIPTION OF THE DRAWINGS

FIGS. 1 to 4 show a lamp unit according to an embodiment of the present invention, in which:

FIG. 1 is a perspective view of the lamp unit;

FIG. 2 is a sectional view taken along line II—II in FIG. 1;

FIG. 3 is a bottom view of the lamp unit; and

FIG. 4 is a sectional view taken along line IV—IV in FIG. 1.

DETAILED DESCRIPTION OF THE PREFERRED EMBODIMENT

Figure 4:
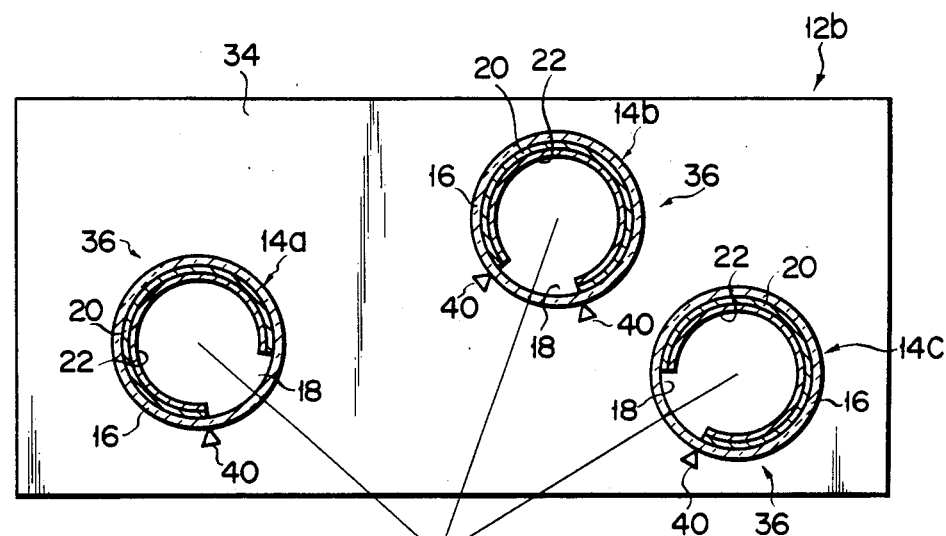

An embodiment of the present invention will now be described in detail with reference to the accompanying drawings.

FIGS. 1 to 4 show a lamp unit used as a light source of a copying machine.

The lamp unit comprises first and second support members 12a and 12b facing each other, and three baseless fluorescent lamps 14a, 14b and 14c supported parallel to one another between members 12a and 12b. Lamps 14a, 14b and 14c emit light beams of wavelengths corresponding to red, blue and green, respectively.

Each of lamps 14a, 14b and 14c is an aparature-type fluorescent lamp which comprises straight bulb 16 with two sealed ends and lead wires 17 extending from both ends of the bulb. Wires 17 are connected individually to electrodes (not shown) in bulb 16. Bulb 16 is provided with elongate radiation window 18 extending in its axial direction. Reflector film 20 and phosphor film 22 are stacked over the whole region of the inner peripheral surface of bulb 16 except window 18. A light beam produced in bulb 16 is reflected by reflector film 20, and radiated through window 18.

First support member 12a includes base plate 24 and three support portions 26 integral therewith. Each support portion 26 has hollow bottomed cylinder 26a which protrudes from base plate 24 on the opposite side thereof to second support member 12b. The inner surface of cylinder 26a defines a support recess which opens toward support member 12b. Cylinders 26a are arranged so that the centers of their openings are located individually on the vertexes of a triangle. The bore of each cylinder 26a is a little smaller in diameter than each fluorescent lamp 14. The opening portion of the bore is tapered inward. A pair of adhesive ports 28 and air vent 30 are bored through the bottom wall of cylinder 26a. A pair of wire outlet ports 32 penetrate the bottom and peripheral walls of cylinder 26a. Lead wires 17 of each lamp 14 are passed through ports 32. As seen from FIG. 3, the peripheral wall of each cylinder 26a is marked with positioning index 33 for positioning radiation window 18 of bulb 16.

Second support member 12b includes base plate 34 and three support portions 36 integral therewith. Each support portion 36 has hollow bottomed cylinder 36a which protrudes from base plate 34 on the opposite side thereof to first support member 12a. The inner surface of cylinder 36a defines a support recess which opens toward support member 12a. Cylinders 36a are arranged symmetrical with cylinders 26a of member 12a. The bore of each cylinder 26a is stepped so that its opening side is larger in diameter. Large-diameter portion 38, which is a little greater in diameter than bulb 16, extends a predetermined length in the axial direction of cylinder 36a. Like cylinder 26a, each cylinder 36a has a pair of adhesive ports 28, air vent 30, and a pair of wire outlet ports 32. As shown in FIG. 3, a plurality of positioning indexes 40 are marked on base plate 34, adjoining the opening edges of their corresponding cylinders 36a.

One end of each fluorescent lamp 14 is rigidly inserted in its corresponding cylinder 26a of first support member 12a, and the other end in cylinder 36a of second support member 12b. These two ends of lamp 14 are fixed to support members 12a and 12b by means of an adhesive agent, e.g., thermoplastic resin 42, filling cylinders 26a and 36a. Thus, lamps 14a, 14b and 14c are supported parallel to one another by support members 12a and 12b, and base plates 24 and 34 of members 12a and 12b are kept parallel to each other and at right angles to the lamps. Each lamp is fixed in a manner such that its radiation window 18 is in line with its corresponding indexes 33 and 40. In this embodiment, in particular, radiation windows 18 of lamps 14a, 14b and 14c are directed so that light beams radiated from the windows intersect one another on a desired straight line, as shown in FIG. 4. Lead wires 17 are led outward in the radial direction of the cylinders through their corresponding wire outlet ports 32, and connected to feeders (not shown). The wires are insulated from one another by the adhesive agent 42 filling the cylinders.

The lamp unit of the above described construction is assembled in the following processes.

First, lead wires 17 extending from one end of each lamp are inserted into one of cylinders 26a of first support member 12a, and are led out of the cylinder through wire outlet ports 32. Then, one end of bulb 16 is inserted into cylinder 26a until its peripheral edge abuts against the tapered face of cylinder 26a. Thereafter, lead wires 17 extending from the other end of lamp 14 are inserted into their corresponding cylinder 36a of second support member 12b, and led out of the cylinder through ports 32. Then, the other end of the lamp is inserted into large-diameter portion 38 of cylinder 36a. Lamps 14a, 14b and 14c are held parallel to one another, and base plates 24 and 34 of support members 12a and 12b parallel to each other and at right angles to the lamps. Variations in length of lamps 14a, 14b and 14c are absorbed by large-diameter portion 38 of cylinder 36a which extends for the predetermined length in the axial direction of the cylinder. Thus, the aforesaid relative positions of the lamps and support members can be set securely.

In this state, each fluorescent lamp is rotated about its axis so that the edges of radiation window 18 are in line with their corresponding positioning indexes 33 and 40. Subsequently, welded adhesive agent 42 is poured into cylinders 26a and 36a through their ports 32. It is instantaneously cooled by the members arround it and becomes hand. As a result, the ends of each lamp are individually fixed in cylinders 26a and 36a, and lead wires 17 are insulated from one another by adhesive agent 42. In pouring the adhesive agent, air is discharged from cylinders 26a and 36a through their respective air vents 30. Thereafter, wires 17 are connected to the feeders (not shown).

Thus, the assembling of the lamp unit is finished.

According to the lamp unit constructed in this manner, fluorescent lamps 14a, 14b and 14c are fixed to common support members 12a and 12b. Therefore, three lamps can be handled as a single unit, and can easily be mounted in or removed from a narrow place, such as the inside of a copying machine. The relative positions of the lamps, especially those in the direction of radiation, can always be maintained constant. Accordingly, the positions of the lamps relative to the copying machine can be determined at a time by setting the relative positions of the machine and the support members. Thus, the lamps need not be adjusted one by one.

Moreover, the fluorescent lamps are attached to the support members without bases. Therefore, they are free from play, unlike those prior art lamps which are retained through the engagement between base pins and socket. Also, the position of the radiation windows or the radiating direction of the lamps can be adjusted freely. In this embodiment, since support members 12a and 12b are each provided with positioning indexes 33 and 40, the radiating direction can be determined accurately with ease.

Since wire outlet ports 32 penetrate both the peripheral and bottom walls of the cylinders, the wire leading direction may be shifted between the radial and axial directions of the cylinders, depending on the mounting position of the lamp unit. Thus, the wire arrangement for the mounting work is easy.

Further, variations in length of the lamps are absorbed by the large-diameter portions of the cylinders. Thus, length of that portion of the lamps which expose outside is equal to one another, so that light beams radiated from the lamps can be made unform.

It is to be understood that the present invention is not limited to the embodiment described above, and that various changes and modifications may be effected therein by one skilled in the art without departing from the scope or spirit of the invention. For example, the lamp unit of the invention may also be applied to any other apparatuses, such as facsimiles, than copying machines. Further, the fluorescent lamps may be fitted in the support portions without the use of any adhesive agent. In the above embodiment, the lamp unit uses aparture-type fluorescent lamps wherein a phosphor film is not coated on the inner surface of the radiation window. Instead of the aparture-type lamps, reflection-type fluorescent lamps with a phosphor film coated on the inner surface of the radiation window may be used.

In the above described embodiment, the support cavity fixedly receiving each end of the bulb is defined by the bottomed cylinder integral with the substrate. Instead of using the cylinder, however, the substrate may be made thick enough to be formed with the support cavity therein.

What is claimed is:

1. A lamp unit comprising:
   first and second support members facing each other, each support member including a plurality of support portions arranged at predetermined intervals, the support portions of the first support member being disposed directly opposite those of the second support member; and
   a plurality of baseless fluorescent lamps supported parallel to one another by the first and second support members, each lamp including a straight bulb with two sealed ends and lead wires extending from the ends of the bulb, said bulb having an elongate radiation window extending in the axial direction thereof, one end of said bulb being fixed to each corresponding support portion of the first support member and the other end to each corresponding support portion of the second support member, with the radiation window thereof oriented in a predetermined direction.

2. The lamp unit according to claim 1, wherein each of said support portions of the first support member includes a circular recess opening toward the second support member, and each of said support portions of the second member includes a circular recess opening toward the first support member, the two ends of each bulb being fixedly inserted in the recesses of their corresponding support members.

3. The lamp unit according to claim 2, wherein the ends of each bulb are fixed to corresponding support portions by means of an adhesive agent filling the recesses.

4. The lamp unit according to claim 3, wherein said first and second support members each include a base plate and a plurality of hollow bottomed cylinders integral with the base plate and defining the recesses.

5. The lamp unit according to claim 4, wherein each of said cylinders has a port in the bottom wall thereof through which the adhesive agent is poured into the cylinder.

6. The lamp unit according to claim 4, wherein each of said cylinders has a lead wire outlet port, and the lead wires of said fluorescent lamps are led out of the cylinders through the outlet ports, and are insulated from one another by the adhesive agent filling the cylinder.

7. The lamp unit according to claim 6, wherein each of said lead wire outlet ports penetrates the bottom wall and peripheral wall of each corresponding cylinder.

8. The lamp unit according to claim 2, wherein each of said recesses of the first support member is a little smaller in diameter than the bulb, and the opening portion of the recesses spreads out toward the second support member and abuts one end edge of each corresponding bulb.

9. The lamp unit according to claim 8, wherein each of said recesses of the second support member includes a large-diameter portion which is a little larger in diameter than the bulb and located on the opening side of the recess, and a small-diameter portion which is a little smaller in diameter than the bulb and located between the large-diameter portion and the bottom of the cylinder.

10. The lamp unit according to claim 1, wherein said first and second support members each have positioning indexes for determining the positions of the radiation windows of the bulbs relative to the support members.

11. The lamp unit according to claim 1, wherein said fluorescent lamps are arranged so that light beams emitted from the radiation windows thereof intersect on a desired straight line.

12. A lamp unit comprising:
a plurality of baseless fluorescent lamps each having a straight bulb with two sealed ends and lead wires extending from the ends of the blub, said bulb having an elongate radiation window extending in the axial direction thereof;

first and second support members arranged at a predetermined interval for supporting said fluorescent lamps, said first support member having support portions each rotatably receiving one end of corresponding bulb, and said second support member having support portions each rotatably receiving the other end of corresponding bulb; and means for fixing said received bulb ends to corresponding support portions, with said radiation window oriented in a predetermined direction.

13. The lamp unit according to claim 1, wherein said fixing means includes an adhesive agent.

* * * * *